United States Patent [19]

Faerber et al.

[11] Patent Number: 4,483,544
[45] Date of Patent: Nov. 20, 1984

[54] SOCKET PIPE SEAL FOR CONCRETE PIPES

[75] Inventors: Peter Faerber; Hans-Theo Weingarten; Rudolf Rösgen, all of Leverkusen; Benno Wedekind, Leichlingen, all of Fed. Rep. of Germany

[73] Assignee: Denso-Chemie Wedekind KG, Leverkusen, Fed. Rep. of Germany

[21] Appl. No.: 422,194

[22] Filed: Sep. 23, 1982

[30] Foreign Application Priority Data

Oct. 28, 1981 [DE] Fed. Rep. of Germany ....... 3142724
May 25, 1982 [DE] Fed. Rep. of Germany ....... 3219522

[51] Int. Cl.$^3$ .............................................. F16J 15/32
[52] U.S. Cl. ................................................ 277/207 A
[58] Field of Search ................. 277/DIG. 2, 207 A, 1

[56] References Cited

U.S. PATENT DOCUMENTS 2,368,610  1/1945  Fischer .................................... 18/59
4,372,905  2/1983  Bohman .................................. 277/1

FOREIGN PATENT DOCUMENTS

2252089  3/1973  Fed. Rep. of Germany ... 277/207 A
3100192  12/1981  Fed. Rep. of Germany .
227175  9/1969  Sweden ......................... 277/DIG. 2
398300  9/1933  United Kingdom .
622058  4/1949  United Kingdom .

Primary Examiner—Robert I. Smith
Attorney, Agent, or Firm—Spencer & Frank

[57] ABSTRACT

A socket seal for a tubular member defining a socket having an open end delimited by a free edge, an inner wall extending from the free edge and a base remote from the open end, and into the open end of which socket a further member is to be inserted to form a sealed connection, the seal being composed of a sealing ring made of an elastomer material and including a holding portion embedded in the tubular member in the region of the outer edge of the socket, a band-shaped fastening portion joined to the holding portion, and a sealing portion joined to the fastening portion and having a configuration such that it has a greater thickness at a point spaced from the fastening portion than at the location where it is joined to the fastening portion. The sealing portion is movable by bending relative to the fastening portion toward the base of the socket from an installation state to an operating state, the ring being configured such that in the operating state one surface of the sealing portion bears against the inner wall of the socket, and in the installation state the sealing ring delimits the free edge of the socket and the one surface of the sealing portion is approximately flush with the inner wall of the socket.

19 Claims, 7 Drawing Figures

SOCKET PIPE SEAL FOR CONCRETE PIPES

BACKGROUND OF THE INVENTION

The present invention relates to a pipe socket seal for concrete pipes, of the type including a sealing ring of elastomer material fastened to the socket and a band-shaped fastening member cemented into the socket with the aid of a holding member. The fastening member includes a thickened sealing portion whose thickness corresponds to the intended compression of the sealing portion between the inner wall of the socket and the outer wall of the inserted pipe end. The sealing portion is moved from its installation state, or position, into an installed state, or position, by bending it over in the direction toward the bottom of the socket. Then, upon insertion of a pipe end into the socket, the sealing portion assumes an operating state.

The term "installation state" refers to the position of the sealing member with respect to the socket during manufacture and possibly during subsequent transport and storage. The term "operating state" refers to the position taken up by the sealing member when, during construction of a pipeline, the end of an adjacent pipe has been inserted into such a socket.

DE-OS [FRG Laid Open Application] No. 2,252,089 discloses a sealing arrangement for concrete pipes of the above-mentioned type. The prior art sealing arrangement is designed in the manner of a rolling ring seal. It differs, however, from the classical rolling ring seal in that it is cemented into the socket of the concrete pipe via a holding collar. In order for the sealing ring to be moved from its installation position into the sealing position or into the above-defined "operating state", when the tip end is pushed into the socket, it is necessary for the sealing ring to project in its cross section at least partially beyond the inner wall surface of the socket to assure that, when the tip end is inserted into the socket, the rolling process can take place.

With respect to manufacturing considerations, this sealing arrangement has the drawback that not only is it necessary to obtain specially shaped subsockets, or mold forms, for the manufacturing process, i.e. the previously customary subsockets can no longer be employed, but, in addition, due to the undercut position of the rolling region required in manufacture, an additional releasable shaping ring must be inserted into the socket. This makes the manufacturing process more difficult and expensive.

A certain drawback of the prior art seal is, moreover, that due to the rolling of the sealing member into its end position during insertion of the tip end, the sealing member comes to lie almost at the rear end of the socket so that the inserted tip end, after installation of the pipe, must be pressed practically in every case flush against the bottom of the socket in order to assure that the sealing ring is positioned properly.

A further drawback of the prior art seal is that during insertion of the tip end, the sealing ring is rolled over the part whose cross section is weakened because of the holding member that is cemented in at that point. Since, during the rolling process, practically the full compression of the sealing ring is already in effect, there exists the danger that the socket will burst apart at this point.

U.S. Pat. No. 3,866,925 discloses, particularly with respect to the embodiments shown in FIGS. 6, 12, 14, sealing arrangements which are fastened to a pipe socket via a portion embedded in the socket and in which the sealing element is formed by an annular lip which slides on the inserted pipe end when the latter is inserted. The sealing force is generated by a spring element which is embedded in the elastic material of the sealing lip.

One drawback of this prior art design is that the sealing force is predetermined by the spring element and is therefore reduced compared to sealing arrangements in which the sealing force is generated by compressing one sealing member. Since the sealing member has a lip-shaped design, there further results a linear-type contact with the counterface of the gap to be sealed so that here again, in conjunction with the reduced sealing forces, for example on rough concrete surfaces, the danger of leaks in the socket seal cannot be excluded.

The embodiment shown in FIG. 6 of U.S. Pat. No. 3,866,925 has the drawback that during insertion of the pipe end the free edge of the sealing element may be pulled into the inner end of the socket which is formed in order to protect the sealing element from shear loads and this may either damage the seal, particularly in its edge regions, or insertion of the pipe end beyond the end of that cavity is prevented completely so that the sealing element itself would have to absorb all transverse forces including traffic loads.

In the embodiment shown in FIG. 12 of U.S. Pat. No. 3,866,925, proper positioning of the sealing element on a smooth mold form, or subsocket, is impossible so that, on the one hand, auxiliary abutments must be used when the sealing element is pulled over the subsocket and these auxiliary abutments must be removed before the cementing process and, on the other hand, there exists the danger, during pouring of the cement, that the sealing element is displaced. In the embodiment shown in FIG. 14 of that patent, the undercut between the seal and the bottom of the socket again requires the additional provision of a removable shaping ring which must be applied to the subsocket before the cementing process.

SUMMARY OF THE INVENTION

It is an object of the present invention to provide a pipe socket seal of the above-mentioned type which permits the connection of the seal with the pipe body forming the socket during manufacture thereof without any modifications to the existing molding tools and without additional shaping pieces having to be applied to the subsocket, or mold forms.

The above and other objects are accomplished by the present invention in that in the installation state the sealing ring forms the free inner edge of the socket opening and that surface of the sealing portion which in the operating position rests against the inner wall of the socket is approximately flush with the inner wall of the socket when in the installation state. Such a sealing ring can be completely pushed onto a conventional subsocket, or mold, which can then be pulled out smoothly after the concrete which has been poured into the mold has set.

During subsequent assembly of a pipeline, the sealing ring is either placed in its operating state manually before the pipe end is inserted in the socket or the penetrating pipe end itself pushes the sealing portion over in the direction toward the bottom of the socket. The sealing portion then projects over the inner wall of the socket so that during insertion of the pipe end, the seal of the pipe connection is formed by appropriate compression of the sealing member in the radial direction.

A further advantage of the seal construction according to the invention is that the sealing member, when bent into the operating state, is oriented in such a manner that the holding portion which has been cemented into the socket wall comes to lie in front of the sealing portion, with respect to the insertion direction of the pipe end, so that at no time will the part of the socket cross section which has been reduced to accommodate the sealing ring be stressed by pressure forces.

According to a preferred embodiment of the invention, in the installation state, a band-shaped fastening portion connecting the holding and sealing portions together and the sealing portion rest against one another with their full faces and the holding portion is disposed on the side of the fastening portion facing away from the sealing portion. This has the advantage that the holding portion is anchored at a sufficient distance from the frontal face of the socket as well as from the inner wall of the socket so that the groove formed in the socket by the holding portion will not break out.

According to another preferred embodiment of the invention, the band-shaped fastening portion and the sealing portion are given the same area on their faces facing one another in the installation state.

It is here particularly advisable, according to a further feature of the invention, for the band-shaped fastening portion to be oriented at an acute angle with the socket wall—with reference to a longitudinal section through the socket—and the transition between the fastening portion and the sealing portion lies in the region of the point of intersection of the fastening portion with the inner wall of the socket.

According to a further feature of the invention, the cross section of the sealing portion is convex at least on its side which, in the installation state, faces away from the fastening portion, and preferably has an approximately triangular shape, with the height of the curvature corresponding to the intended effective cross section. The advantage of this design is that, after the sealing portion has been bent over into the operating state, the now exposed surface of the sealing portion has a smooth conical shape and thus produces a centering effect when the pipe end is inserted. Moreover, with this design there result very good deformation properties for the sealing member which lead to perfect contact with the sealing surface of the socket as well as with the sealing surface of the connected pipe end.

According to a specific embodiment of the invention it is provided that, in the installation state, the sealing and fastening portions are connected to one another by a releasable connection at their mutually facing surfaces. This has considerable advantages already for the manipulation of the loose sealing ring since the relatively thin-walled, band-shaped fastening portion is fixed against the substantially more form-retaining sealing portion and thus perfect positioning on the subsocket is assured when the element is pulled over the subsocket under tension. This design is of particular advantage if the sealing ring is produced from cross-cut pieces of an extruded profile by connecting their ends, since the gluing together of sealing and fastening portions prevents inadvertent bending over of the fastening portion when it is pulled onto the subsocket. The releasable connection may be produced, in one embodiment of the invention, by means of a hot melt adhesive, in another embodiment of the invention, by means of a double-sided adhesive tape, or, in a further embodiment of the invention, by form-locking, or interlocking, engagement of a projection at one part into a corresponding groove in the other part.

In a suitable embodiment of the invention it is provided that the holding portion has an approximately trapezoidal cross section which is oriented approximately at a right angle with the fastening portion. It is preferred, in this connection, for the fastening and holding portions to form together an approximately T-shaped cross section. This assures secure fixing of the sealing ring so that it cannot be pulled out of its anchored position by the forces occurring either during bending into the operating state or during insertion of the associated pipe end. This applies also to storage at the installation site where it must be assured that children, for example, cannot pull the seal out of the socket.

In a further embodiment of the invention the band-shaped holding portion is provided with a covering apron which extends in the direction toward the bottom of the socket and can be placed against the inner wall of the socket. With this covering apron, the part of the inner wall of the socket which is covered by the "seal" component is enlarged considerably so that in the region of this part there is no longer any direct contact between the surface of the subsocket and the poured-in concrete. With this design it is possible to extract the subsocket also by machine and possibly with the aid of vibratory devices without breaks occurring in the area of the inner wall of the socket which is critical for the effectiveness of the seal, i.e. the area where the sealing portion contacts the socket in the installed state.

It must be considered in this connection that in the industrial production of concrete pipes, the subsockets, or molds, are extracted already at a time when the concrete has not yet completely set. In such cases it may happen, in spite of the customary treatment of the subsocket with coating means, that break-outs may occur in inner faces of the fresh concrete in the region of the subsocket, precisely in the critical region. By providing the covering apron according to the invention, the ability of the subsocket to be extracted is improved.

In particular forms of construction of this embodiment of the invention, the covering apron covers the region of the inner wall of the socket where the sealing portion will contact it when the pipe is installed. This helps to assure that the region of highest compression of the sealing portion is free of edges or steps which could lead to leaks. The covering apron should have the smallest possible thickness.

The lower limit for the thickness of the covering apron is here determined by the manufacturing process for the seal and/or the material employed for this purpose. When dimensioning the compression cross section of the sealing portion, however, the thickness of the covering apron, which is likewise made of elastic material, must be considered correspondingly so that the required total compression of the seal can be maintained.

Since the sealing ring is applied to the subsocket, advisably under tension, before pouring of the concrete, a series of other advantages results. The tension has the result, on the one hand, that once the subsocket has been removed, the sealing portion lifts itself away from the contact face given by the installation state. With suitable selection of the tension, the sealing portion will lift itself off to such an extent that it is automatically bent over into the operating state when the pipe end of the cooperating pipe is inserted into the socket.

Manual bending into the operating state is thus no longer required if the tension is appropriately preselected.

After the subsocket is pulled out, the covering apron is also lifted off from the concrete surface due to the applied tension so that the concrete surface disposed under the covering apron can be visually inspected in the simplest manner. Any shrinkage cavities in this area can thus be located and repaired. Such a visual inspection is very important because this area of the socket in particular forms the sealing surface. Shrinkage cavities, break-outs or the like in the concrete surface in this region would lead to a reduction of the compression of the sealing portion and thus raise the danger of the occurrence of leaks in the pipe connection.

According to a preferred form of construction of this embodiment of the invention, the free edge of the covering apron has a lip shape. This has the advantage that the interstice between the covering apron and the subsocket is sealed so that when the concrete is poured in during the manufacture of the pipe no cement milk, or laitance, can flow into this space. A further advantage of this feature of the free edge of the covering apron is that the above-described automatic raising of the covering apron after removal of the subsocket is enhanced.

Another feature of the invention provides that the sealing portion is given a lip at its free edge. The arrangement of a lip at the sealing portion also serves the purpose of preventing the entrance of laitance between seal and subsocket during the concrete molding process. Here again the arrangement of this lip enhances the raising of the sealing portion from the concrete body after removal of the subsocket.

According to a further feature of the invention, the holding portion disposed at the band-shaped fastening portion, and preferably having a trapezoidal cross section, is provided with an outwardly curved bottom surface. This design has the advantage, compared to a planar bottom surface, that deformability is reduced and consequently removal of the cemented-in sealing ring is made more difficult.

The present invention will now be explained in greater detail with the aid of schematic drawings representing various embodiments.

DESCRIPTION OF THE PREFERRED EMBODIMENTS

Figure 1:
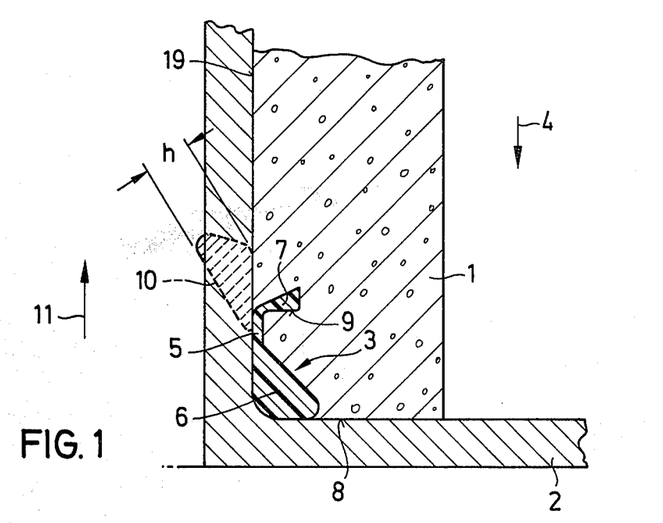
FIG. 1 is a longitudinal cross-sectional, detail view of a socket with a seal according to the invention in the installation state.

In the longitudinal, or axial, cross-sectional view of FIG. 1 showing part of the socket end 1 of a concrete pipe, the subsocket, or mold, 2 required for forming the socket end of the connection is likewise shown in longitudinal section. During manufacture, the sealing ring 3 which is to be embedded in is pulled onto the subsocket 2 under tension until it reaches the lower end of subsocket 2. The tension assures that during pouring in of the cement, which enters the mold in the direction of arrow 4, i.e. from the top toward the bottom, the sealing ring 3 can not float up.

The sealing ring 3 includes a band-shaped fastening portion 5 which merges into a sealing portion 6 whose cross section becomes thicker. A holding portion 7 which in the illustrated embodiment has a trapezoidal cross section, or the form of a flaring tenon, is connected to fastening portion 5.

The sealing portion 6 has an approximately triangular cross section with the height h of the triangle corresponding to the desired thickness of sealing portion 6. The holding portion 7 is oriented approximately at a right angle to the band-shaped fastening portion 5 and, after pouring in of the concrete, is completely enclosed by concrete. However, care must be taken during the manufacture of the profile for the sealing ring that, after application of the sealing ring under tension onto the subsocket 2, the holding portion 7 takes on the position shown in the drawing and, if possible, the face 9 of the holding member facing the axial end face 8 of the socket 1 extends approximately parallel to this face, preferably at a slightly upward inclination, i.e. upward to the right in FIG. 1, so that air bubbles can escape from this area during the pouring in of concrete and thus shrinkage cavities, which could impair a firm anchor of the holding member 7 in the concrete, are avoided.

After removal of the subsocket 2, the sealing portion 6 of the sealing ring 3 forms the free inner edge of the socket opening. As a result of the tension originally imposed on ring 3, and its release by removal of part 2, sealing portion 6 is raised away, i.e. radially inwardly, from the socket body. Depending on the degree of tension, the sealing portion 6 can be placed manually into the installed state shown in dashed lines or the sealing member 6 is gripped by the pipe end of the pipe to be connected to the socket when the pipe is inserted and then pressed into the operating state when the pipe end is pushed in further so that the required sealing force is generated by the sealing ring. Before bending over the sealing portion 6, the area on which it will come to rest when in the operating state may be subjected to visual examination.

As can be seen in the drawing, due to the approximately triangular shape of the cross section of sealing portion 6 in its operating state, the now outwardly disposed area 10 of sealing portion 6 forms an annular face which is conically tapered in the insertion direction (arrow 11) thus providing for good centering during insertion of the pipe end. The area 10 and the pipe end are preferably coated with sliding agents in the usual manner before they are pushed into one another.

The preferred embodiment of the sealing ring shown in FIG. 2 again has a sealing portion 6 having an approximately triangular cross section. However, in this embodiment, the sealing portion 6 is connected with a band-shaped fastening portion 12 which, together with its holding portion 13, has an approximately T-shaped cross section. In the illustrated installation state, fastening portion 12 and sealing portion 6 contact each other over their full areas with the again trapezoidal holding portion 13 being oriented in such a manner that its lateral face 9 which is directed toward face 8 extends towards the fill-in direction (arrow 4) at an acute angle with respect to face 8 of socket 1 so that the formation of shrinkage cavities in this region due to the inclusion of air bubbles is practically eliminated. The illustrated cross-sectional shape is particularly well suited for the manufacture of the sealing ring from an extruded profile.

Figure 2:
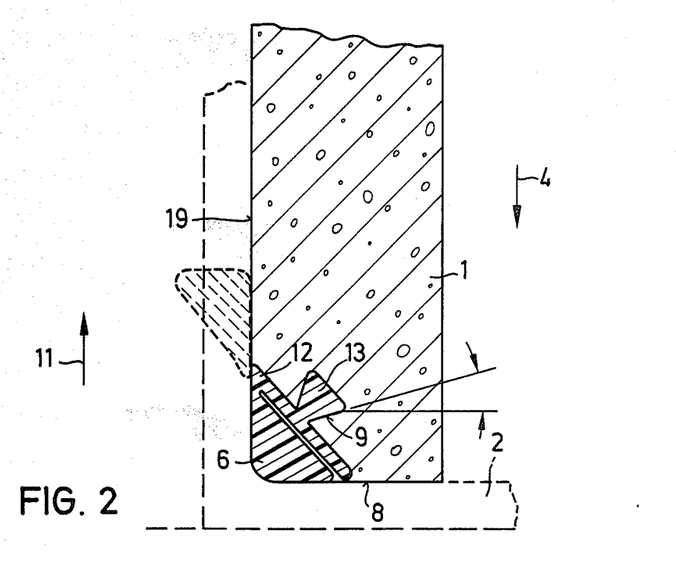
FIGS. 2 and 2a are similar longitudinal cross-sectional, detail views of further embodiments of a socket seal according to the invention.

When the sealing ring is placed on subsocket 2, which is shown in dashed lines, and if the thickness of the sealing member 6 in the transition region toward the fastening member 12 is dimensioned appropriately, the different expansion conditions produce perfect alignment of the holding portion 13 in the desired position.

A further advantage of this embodiment is that the fastening portion 12 and the sealing portion 6 can be fixed with respect to one another at their contacting faces by means of a releasable connection so that an easily handled profile results. The releasable connection can be effected by means of a hot melt adhesive which is applied, for example during the manufacture of the profiled rod, to the corresponding faces of the fastening portion 12 and is then connected with the sealing portion 6 by pressing both parts together. Instead of a hot melt adhesive the connecting of parts 6 and 12 for the above mentioned purpose may be effected by means of a double-sided adhesive tape. After removal of the subsocket 2, sealing portion 6 is brought into the operating state in the same manner as described for the embodiment of FIG. 1, in that it is bent over in the direction towards the bottom of the socket, whereby the connection between parts 6 and 12 is released.

Figure 2A:
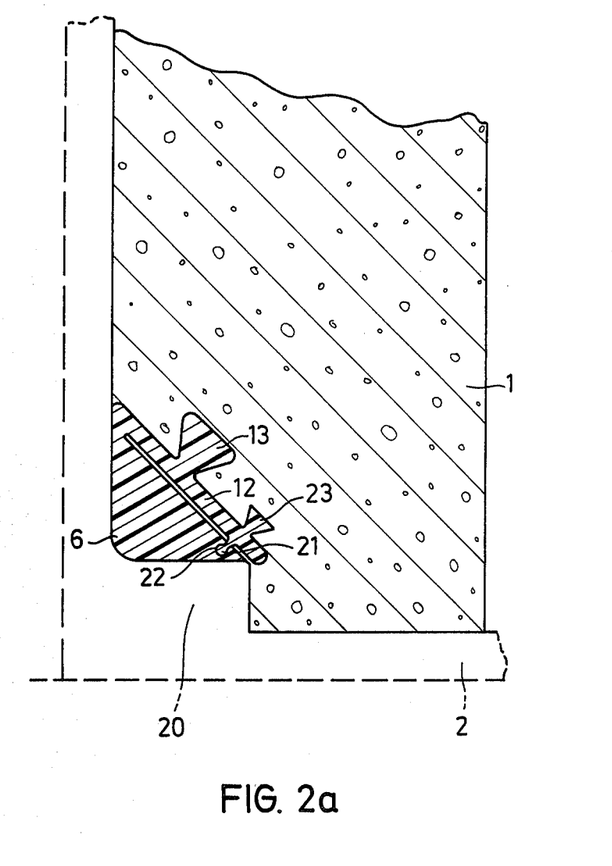

As shown in FIG. 2a, instead of gluing sealing portion 6 to fastening portion 12 it is possible to provide a releasable interlocking connection. As illustrated, this may be composed of a bar 21 having a thickened head and located at the free edge of fastening portion 12, and a correspondingly shaped groove 22 in sealing portion 6. For the installation state, the bar 21 is "buttoned" into the groove 22. This causes the gap between the faces of sealing portion 6 and fastening portion 12 which contact one another in the installation state to be closed as in the glued connection of FIG. 2, which is likewise advisably provided in the edge region, so that during the cementing process no laitance can enter through the gap. The face of sealing portion 6 which later forms the sealing face, shown at 10 in FIG. 1, thus remains clean.

Advisably, the fastening portion 12 is provided with an additional, smaller dimensioned holding member 23 in the form of a flaring tenon in the region of the bar-groove connection 21, 22 which assures that upon release of the bar/groove connection the fastening portion remains in its intended position in the socket.

Figure 3:
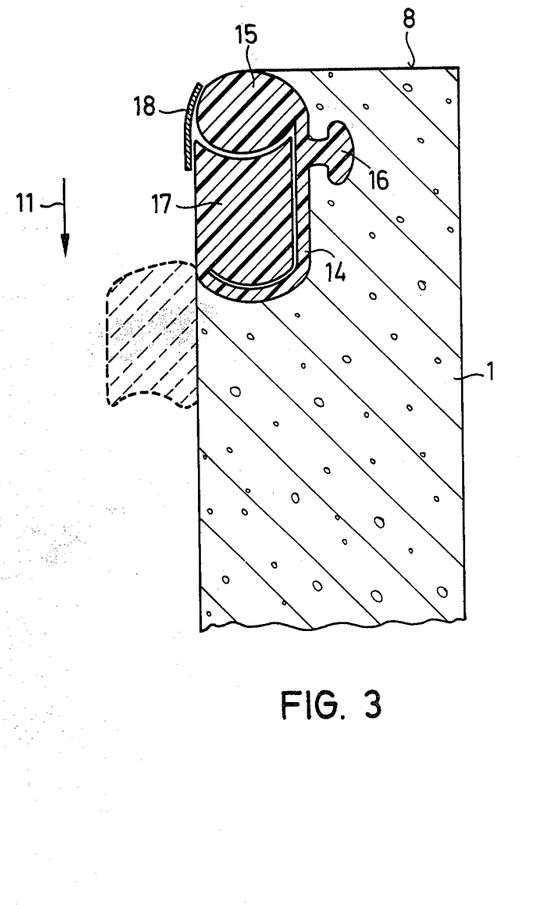
FIG. 3 is a longitudinal cross-sectional, detail view of a further embodiment of a socket seal according according to the invention.

In the embodiment shown in FIG. 3, the band-shaped fastening portion 14 is provided with a thickened part 15 which defines the front edge of the socket opening and in whose region there is also disposed the holding portion 16 which here has a hammerhead shape, for example. In the installation state, the sealing portion 17 is "rolled" into the band-shaped fastening portion, with sealing portion 17 and thickened part 15 being connected either by being suitably shaped to interengage, as shown, or by a separate adhesive member, for example by means of the indicated adhesive strip 18. After removal of the subsocket and after removal of the possibly provided adhesive strip 18, the sealing portion 17 is folded into the installed state shown in the broken lines.

All embodiments may be produced as molded articles or from extruded profiles. The elastomer material employed may have a dense structure as well as a cellular structure. If the sealing ring is an extruded profile, it is moreover possible to produce, in a coextrusion process, a sealing ring whose holding portion is of a material having a dense structure and great hardness while the sealing portion is of a material having a cellular structure with the hardness or resilience required to produce the desired sealing forces. The fastening portion connecting the holding portion and the sealing portion is then likewise made of a material having a dense structure and is anchored in the sealing portion.

The outer contour of the sealing portion 6 of the embodiments of FIGS. 1, 2, 2a in the illustrated installation state corresponds to the associated contour of the subsocket employed in the transition region between the faces forming the frontal face 8 and the inner wall 19 (FIG. 2) of the socket. Embodiments in which an additional abutment edge is formed at the front edge of the socket opening by means of a suitable projection 20 of the subsocket 2, as indicated in FIG. 2a, are also within the scope of the present invention since it is of primary importance that undercuts in the region of the inner wall of the socket be avoided during manufacture.

The present invention has been described above for the example of concrete pipes. The same shape of seal can also be used to seal so-called shaft rings which are used to produce entrance shafts in drainage systems. Such shaft rings are also provided on one side with a socket-like recess into which a sealing ring of the proposed type is cemented and at the other end they are designed in the manner of a tip end. A shaft is then formed in that a plurality of shaft rings are placed one on top of the other with their tip ends pointing upwardly and the sealing gap between each tip end and the socket-shaped recess is completely sealed by the cemented-in seal.

Figure 4:
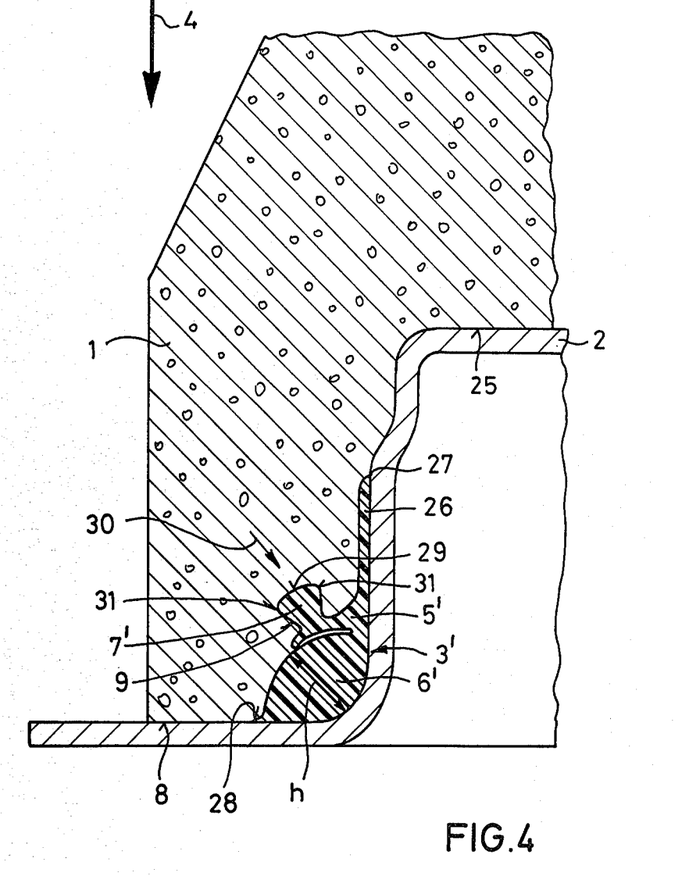
FIG. 4 is a longitudinal cross-sectional, detail view of the socket of a concrete pipe with subsocket inserted and showing a seal according to the invention in the installation state.

In the longitudinal cross section through the socket 1 of a concrete pipe shown in FIG. 4, a part of the subsocket 2 required to manufacture such socket is likewise shown in longitudinal section. During manufacture, the sealing ring 3' to be cemented in is placed under tension onto the subsocket 2 until it reaches its bottom end. The tension prevents the sealing ring from floating upwardly during pouring in of the concrete which enters into the mold in the direction of the arrow 4, i.e. from the top to the bottom.

The sealing ring is composed of a band-shaped fastening portion 5' which merges into a sealing portion 6' with thickened cross section. A holding portion 7' which in the illustrated embodiment has a trapezoidal cross section is connected with the fastening portion. The sealing portion 6' is shaped in the form of a bead with the cross-sectional height h being dimensioned to produce the desired compression force. The holding portion 7' is oriented approximately at a right angle to the band-shaped fastening portion 5' and after the concrete has been poured in is completely encased by the concrete. During manufacture of the profile for the sealing ring 3', care must be taken that after the sealing ring has been pulled under tension onto the subsocket 2, the holding portion 7' takes on the position shown in FIG. 4, if possible the face 9 of the holding portion 7' which faces the frontal face 8 of the socket 1 being oriented at an at least slightly upwardly extending angle so that during pouring in the concrete, air bubbles can escape from this region and thus shrinkage cavities can be avoided which would impair a firm anchor of the holding portion 7' in the concrete.

Figure 5:
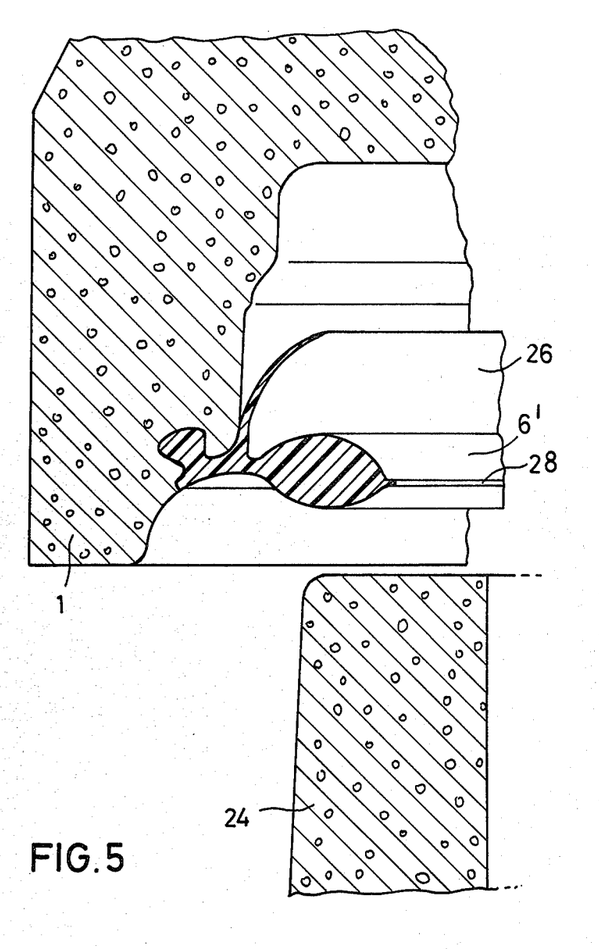
FIG. 5 is a longitudinal cross-sectional, detail view of the arrangement of the seal of FIG. 5 in an intermediate state between the installation and operating states, and with an adjacent pipe end which is to be inserted.

The sealing portion 6' of the sealing ring 3' forms the free inner edge of the socket opening. Under the influence of the tension induced in the ring when placed around subsocket 2, the sealing portion is lifted off the socket body after the subsocket has been removed, as shown in FIG. 5. The degree of tension determines how far the sealing portion 6' is raised. In the illustrated embodiment, the tension is dimensioned in such a way that the sealing portion 6' extends into the free cross section of the socket opening and thus takes on its installed state.

During insertion of the tip end 24 of the adjacent pipe, the sealing portion is engaged by the tip end and is first pressed against the inner surface of the socket. During further insertion of the tip end 24, the sealing portion is brought into the operating state shown in FIG. 6 while being radially compressed substantially perpendicularly to dimension h of portion 6'

As can be seen in FIG. 4, the fastening portion 5' is provided with a covering apron 26 extending in the direction toward the socket bottom 25. The length of the covering apron 26 is dimensioned so that it covers the region of the inner wall of socket 1 where the sealing portion 6' comes to rest in the operating state, a can be seen in FIG. 6. The free edge 27 of the covering apron 26 is given a lip-like form so that the sealing ring, when pulled under tension onto the subsocket 2, rests sealingly against the subsocket 2.

Figure 6:
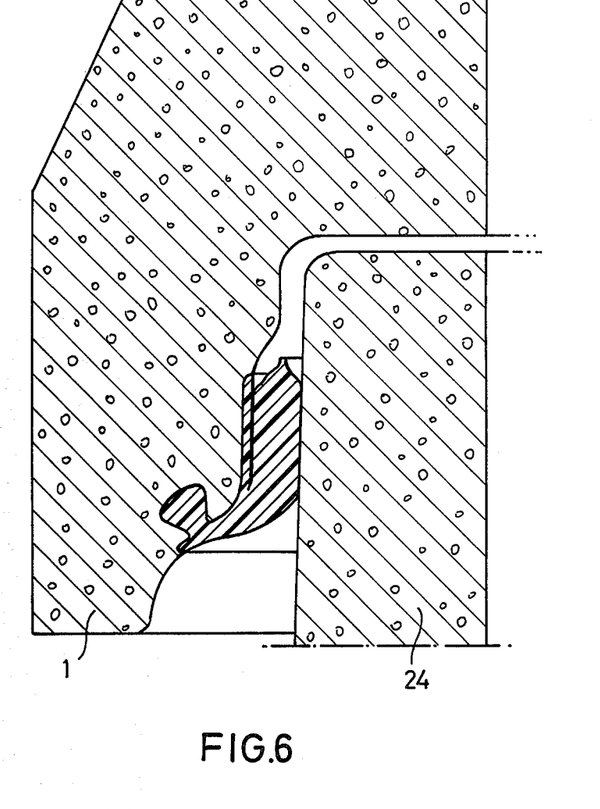
FIG. 6 shows the pipe socket connection of FIG. 5 with the seal in its operating state and the pipe end inserted.

As soon as the subsocket 2 has been removed, the covering apron 26 lifts, as a result of that tension, away from the inner wall of the socket 1 and takes on the position shown in FIG. 5. This exposes the concrete surface covered by the covering apron 26 and permits inspection to determine its condition. In the operating state, the covering apron 26 is again pressed into the flat recess in the inner wall of the socket, which was produced during the molding, as shown in FIG. 6.

In the illustrated embodiment, the sealing portion 6' has an approximately elliptical cross section and is provided with a lip 28 at its free edge. This lip 28 is significant only for the manufacturing process, as can be seen in FIG. 4, and serves to seal the contact area of the sealing ring 3 on the subsocket 2. Since, because of the arrangement of the lip 28, it is impossible for concrete to enter between the subsocket and sealing portion even only at isolated spots, this likewise enhances the raising of the sealing portion 6' from the concrete surface after the subsocket has been removed.

The holding portion 7' which is essentially mounted on the fastening portion 5' and has a preferably trapezoidal cross section, is provided with an outwardly curved bottom surface 29. By curving the bottom surface 29, the deformability of the holding portion 7' is reduced somewhat, i.e. if the sealing ring is subjected to a pulling force, in the direction of arrow 30, tending to pull the holding portion 7' out of its anchored position in the concrete, the delimiting edges 31 of the holding member 7 are prevented from being deflected inwardly under the influence of such force so that a secure anchor of the holding member 7 in the concrete is assured.

The sealing ring may be typically composed of

| | |
|---|---|
| oil-extended styrene-butadiene rubber (SBR) | 45 parts |
| soot | 30 parts |
| extender oil | 20 parts |
| zinc oxide | 2 parts |
| stearic acid | 1 parts |
| age resister | 0.5 parts |
| vulcanizing accelerator (Thiuram) | 1.3 parts |
| sulphur | 0.2 parts | with a density of 1.1 g/cm$^3$ for a product with dense structure and 0.8 g/cm$^3$ for a product with cellular structure.

Typical physical properties for a sealing ring with dense structure are:

| | |
|---|---|
| hardness: | IRHD 40 ± 4 |
| breaking strength: | 10 MPa |
| breaking extension: | 400% |
| compression set (resulting from a deformation of 40% at 70° C. per 22 h): | 20% | as per DIN-Standards No. 4060 or ISO/DIS-Standards No. 4633.3.

It will be understood that the above description of the present invention is susceptible to various modifications, changes and adaptations, and the same are intended to be comprehended within the meaning and range of equivalents of the appended claims.

What is claimed is:

1. A socket seal for a concrete pipe defining a socket having an open end delimited by a free edge, an inner wall extending from the free edge and a base remote from the open end, and into the open end of which socket a further member is to be inserted to form a sealed connection, said seal comprising: a sealing ring made of an elastomer material and including a holding portion embedded in the pipe in the region of the outer edge of the socket, a band-shaped fastening portion joined to said holding portion, and a sealing portion joined to said fastening portion and having a configuration such that it has a greater thickness at a point spaced from said fastening portion than at the location where it is joined to said fastening portion, said sealing portion being movable by bending relative to said fastening portion toward the base of the socket from an installation state to an operating state, said ring being configured such that in said operating state one surface of said sealing portion bears against the inner wall of the socket, and such that in said installation state said sealing ring delimits the free edge of the socket, said one surface of said sealing portion is approximately flush with the inner wall of the socket, said sealing portion rests against said fastening portion, said holding portion is joined to the side of said fastening portion which faces away from said sealing portion, and said holding and fastening portions together have a generally T-shaped cross section.

2. A seal as defined in claim 1 which is configured such that the surfaces of said sealing and fastening portions via which those portions rest against one another in said installation state are substantially coextensive.

3. A seal as defined in claim 2 wherein said fastening portion intersects the inner wall of the socket and extends at an acute angle to the inner wall, with respect to the longitudinal dimension of the socket, and said sealing portion is joined to said fastening portion at the location where said fastening portion intersects the socket inner wall.

4. A seal as defined in claim 1 wherein said ring further comprises means releasably connecting said sealing and fastening portions together for holding said sealing portion in said installation state.

5. A seal as defined in claim 4 wherein said means comprise a body of hot melt adhesive.

6. A seal as defined in claim 4 wherein said means comprise a double-sided adhesive tape.

7. A seal as defined in claim 4 wherein said means include a groove in one of said sealing portion and fastening portion and a bar releasably lockable in said groove and carried by the other one of said sealing portion and fastening portion.

8. A seal as defined in claim 1 wherein said sealing portion is configured such that at least said one surface has a convex configuration when said sealing portion is in said installation state.

9. A seal as defined in claim 8 wherein said one surface of said sealing portion has a generally triangular profile.

10. A seal as defined in claim 1 wherein said holding portion has a generally trapezoidal cross section and extends generally at right angles to said fastening portion.

11. A seal as defined in claim 1 wherein the tubular member has an end face adjacent the free edge and perpendicular to the inner wall of the socket and said holding portion has a surface facing the tubular member end face and extending at an acute angle thereto.

12. A seal as defined in claim 1 wherein said fastening portion has a thickened portion delimiting the free edge of the socket, having a thickness corresponding substantially to the thickness of said sealing portion, and holding said sealing portion in said installation state.

13. A seal as defined in claim 1 wherein said fastening portion is provided with a covering apron extending toward the socket base and arranged to bear against the inner wall of the socket When said sealing portion is in said installation state.

14. A seal as defined in claim 13 wherein said apron covers the region of the inner wall of the socket at which said sealing portion comes to rest in said operating state.

15. A seal as defined in claim 13 or 14 wherein the free edge of said apron has a lip-like form.

16. A seal as defined in claim 13 or 14 wherein said sealing portion is provided with a lip at its edge remote from the location where it is joined to said fastening portion.

17. A seal as defined in claim 13 or 14 wherein said holding portion has an outwardly curved face at the side thereof remote from said fastening portion.

18. A seal as defined in claim 17 wherein said holding portion has a generally trapezoidal cross section.

19. A seal as defined in claim 1, wherein said sealing member, when bent to said operating state, is positioned to be compressed between the further member and said socket at a location displaced from said holding portion.

* * * * *